US012051842B2

(12) United States Patent
Tokuda

(10) Patent No.: US 12,051,842 B2
(45) Date of Patent: Jul. 30, 2024

(54) DIRECTIONAL COUPLER COMPRISING A MAIN LINE AND A SUB-LINE HAVING A PARALLEL CAPACITANCE-RESISTANCE TERMINATION CIRCUIT AND INCLUDING A MOUNT COMPONENT

(71) Applicant: Murata Manufacturing Co., Ltd., Kyoto (JP)

(72) Inventor: Daisuke Tokuda, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 538 days.

(21) Appl. No.: 17/234,973

(22) Filed: Apr. 20, 2021

(65) Prior Publication Data

US 2021/0242559 A1 Aug. 5, 2021

Related U.S. Application Data

(63) Continuation of application No. PCT/JP2019/048600, filed on Dec. 12, 2019.

(30) Foreign Application Priority Data

Dec. 17, 2018 (JP) ................................ 2018-235775

(51) Int. Cl.
*H01P 5/18* (2006.01)

(52) U.S. Cl.
CPC ................ *H01P 5/18* (2013.01); *H01P 5/185* (2013.01)

(58) Field of Classification Search
CPC ........................................................ H01P 5/18

(Continued)

(56) References Cited

U.S. PATENT DOCUMENTS 5,570,069 A * 10/1996 Franke ...................... H01P 5/18 333/116
2010/0026415 A1 2/2010 Mann et al.

(Continued)

FOREIGN PATENT DOCUMENTS

CN 104137329 A 11/2014
JP 2009-027617 A 2/2009

(Continued)

OTHER PUBLICATIONS

International Search Report for PCT/JP2019/048600 dated Feb. 25, 2020.
Written Opinion for PCT/JP2019/048600 dated Feb. 25, 2020.

*Primary Examiner* — Benny T Lee
(74) *Attorney, Agent, or Firm* — Pearne & Gordon LLP

(57) ABSTRACT

A directional coupler (10) includes a main line (11), a sub-line (12), and a termination circuit (13) that is connected to one end (121) of the sub-line (12), and further includes an adjustment terminal (ADJ), as a lead-out terminal, that is led out from a node (N) between the one end (121) of the sub-line (12) and the termination circuit (13). The termination circuit (13) may be formed of a circuit in which a capacitance element (131) and a resistance element (132) are connected in parallel with each other, a capacitance value of the capacitance element (131) may be smaller than a capacitance value with which the directivity of the directional coupler (10) is optimized and a resistance value of the resistance element (132) may be larger than a resistance value with which the directivity of the directional coupler (10) is optimized.

14 Claims, 3 Drawing Sheets

(58) Field of Classification Search
USPC .................................................. 333/109, 111
See application file for complete search history.

(56) References Cited

U.S. PATENT DOCUMENTS

| | | | | |
|---|---|---|---|---|
| 2011/0057746 | A1* | 3/2011 | Yamamoto et al. ...... | H01P 5/18 333/116 |
| 2011/0273242 | A1 | 11/2011 | Totani et al. | |
| 2014/0368293 | A1 | 12/2014 | Mukaiyama | |
| 2021/0013858 | A1* | 1/2021 | Tokuda et al. ............ | H01P 5/18 |

FOREIGN PATENT DOCUMENTS

| | | | |
|---|---|---|---|
| WO | 2010/082346 | A1 | 7/2010 |
| WO | 2013/129447 | A1 | 9/2013 |
| WO | 2017/196652 | A2 | 11/2017 |

* cited by examiner

DIRECTIONAL COUPLER COMPRISING A MAIN LINE AND A SUB-LINE HAVING A PARALLEL CAPACITANCE-RESISTANCE TERMINATION CIRCUIT AND INCLUDING A MOUNT COMPONENT

CROSS REFERENCE TO RELATED APPLICATION

This is a continuation of International Application No. PCT/JP2019/048600 filed on Dec. 12, 2019 which claims priority from Japanese Patent Application No. 2018-235775 filed on Dec. 17, 2018. The contents of these applications are incorporated herein by reference in their entireties.

BACKGROUND OF THE DISCLOSURE

Field of the Disclosure

The present disclosure relates to a directional coupler and a radio-frequency module including the directional coupler.

Description of the Related Art

A directional coupler, which includes a main line and a sub-line that are electromagnetically coupled to each other, is used to extract the power of a radio-frequency signal (i.e., a traveling wave) propagating in a forward direction along a line. A termination circuit is connected to one end of the sub-line in such a directional coupler (for example, refer to Patent Document 1). Directional couplers have an inherent directivity that is determined by the impedance of the termination circuit. "Directivity" is a characteristic quantity that represents the ability to separate a traveling wave and a reflected wave extracted by the directional coupler.

Patent Document 1: Japanese Unexamined Patent Application Publication No. 2009-27617

BRIEF SUMMARY OF THE DISCLOSURE

A directional coupler may be mounted on a substrate by itself or together with other elements to form a radio-frequency module. In this case, the effective impedance of the termination circuit may vary due to the effect of parasitic components of the substrate and the other elements and consequently the directivity of the directional coupler may be shifted from its inherent directivity. In other words, there is a problem in that it is difficult to obtain a stable directivity across a plurality of radio-frequency modules when directional couplers are mounted in a plurality of radio-frequency modules having different substrates and elements mixedly mounted.

Accordingly, an object of the present disclosure is to provide a directional coupler in which the directivity can be easily adjusted with high precision and a radio-frequency module that includes the directional coupler.

In order to achieve the above-described object, a directional coupler according to an aspect of the present disclosure includes a main line, a sub-line, and a termination circuit that is connected to one end of the sub-line, and further includes a lead-out terminal that is led out from a node between the one end of the sub-line and the termination circuit.

Furthermore, a radio-frequency module according to an aspect of the present disclosure includes the directional coupler and a circuit element that is connected to the lead-out terminal of the directional coupler.

With the directional coupler and so forth according to the present disclosure, the impedance of the termination circuit can be measured via the lead-out terminal. Furthermore, a circuit element for reducing the deviation of the measured impedance from the desired impedance can be connected to the termination circuit via the lead-out terminal. As a result, a directional coupler and so forth can be obtained in which the directivity can be easily adjusted with high precision.

DETAILED DESCRIPTION OF THE DISCLOSURE

A plurality of embodiments of the present disclosure will be described in detail using the drawings. The embodiments described hereafter each illustrate a comprehensive or specific example of the present disclosure. The numerical values, shapes, materials, constituent elements, arrangement of the constituent elements, the ways in which the constituent elements are connected to each other and so forth given in the following embodiments are merely examples and are not intended to limit the present disclosure.

Embodiment 1

A directional coupler according to Embodiment 1 will be described using an example of a directional coupler in which a termination circuit is connected to one end of a sub-line.

Figure 1:
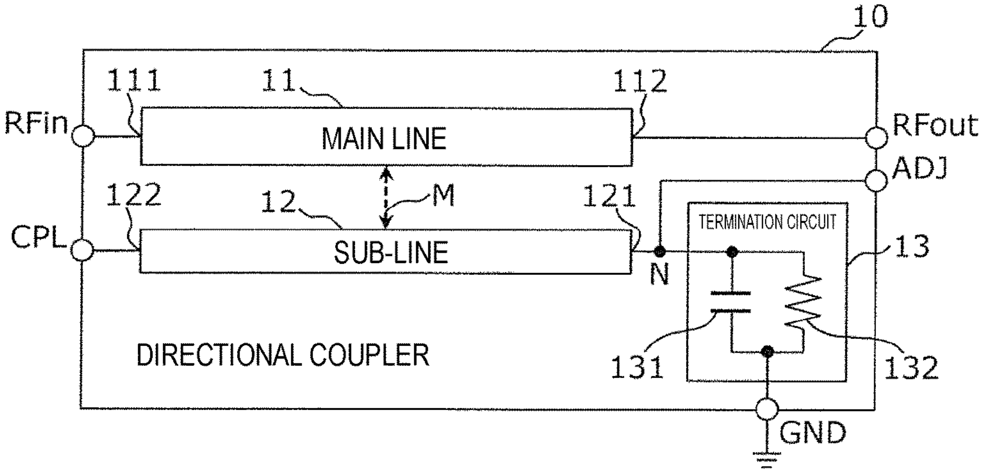
FIG. 1 is a circuit diagram illustrating an example of the functional configuration of a directional coupler according to Embodiment 1.

FIG. 1 is a circuit diagram illustrating an example of the functional configuration of a directional coupler 10 according to Embodiment 1. As illustrated in FIG. 1, the directional coupler 10 includes a main line 11, a sub-line 12, and a termination circuit 13. The main line 11 and the sub-line 12 are electromagnetically coupled to each other as indicated by the dotted-line arrows M.

One end 111 and another end 112 of the main line 11 are respectively connected to an input terminal RFin and an output terminal RFout. One end 121 of the sub-line 12 is terminated via the termination circuit 13. In other words, the one end 121 of the sub-line 12 is connected to a ground electrode (represented by the ground symbol) outside the directional coupler 10 via a ground terminal GND of the directional coupler 10. A node N on a signal path connected between the one end 121 of the sub-line 12 and the termination circuit 13 is connected to an adjustment terminal ADJ. Another end 122 of the sub-line is connected to a coupling terminal CPL. Here, the adjustment terminal ADJ is an example of a lead-out terminal that is led out from a node between the one end 121 of the sub-line 12 and the termination circuit 13. The adjustment terminal ADJ is, for example, connected in parallel with the termination circuit 13. For example, a circuit element (not illustrated), which is provided outside the directional coupler 10, may be connected in parallel with the termination circuit 13 via the adjustment terminal ADJ.

The directional coupler 10 may have a configuration that allows the connection target of the one end 121 of the sub-line 12 and the connection target of the other end 122 of the sub-line 12 to be reversed. In other words, the directional coupler 10 may include a switch or the like that allows switching to be performed so as to connect the one end 121 of the sub-line 12 to the coupling terminal CPL and so as to connect the other end 122 of the sub-line 12 to the termination circuit 13 and the adjustment terminal ADJ. By reversing the connection targets in this way, a signal extracted from the main line to the sub-line can be switched from being a forward-direction signal that flows along the main line from the input terminal RFin to the output terminal RFout to a reverse-direction signal that flows along the main line from the output terminal RFout to the input terminal RFin.

The termination circuit 13 is an impedance circuit that terminates the one end 121 of the sub-line 12 with a desired impedance. The termination circuit 13 is, for example, provided in order to allow the directivity to be adjusted by adjusting the isolation of the directional coupler 10. As an example, the termination circuit 13 is formed of a circuit in which a capacitance element 131 and a resistance element 132 are connected in parallel with each other. One end of the termination circuit 13 is connected to the one end 121 of the sub-line 12, and the other end of the termination circuit 13 is connected to a ground electrode.

The directional coupler 10 is formed of a mount component. The mount component is, for example, an integrated circuit chip in which the main line 11, the sub-line 12, and the termination circuit 13 of the directional coupler 10 are formed on a substrate using semiconductor processes. Note that the directional coupler 10 does not necessarily have to be formed of a mount component and may instead be formed on or in a circuit substrate on which a mount component is mounted or may be formed so as to be divided between a mount component and a circuit substrate.

According to the example in FIG. 1, a circuit element (not illustrated), which is provided outside the directional coupler 10, is connected in parallel with the termination circuit 13 by respectively connecting one end and the other end of the circuit element to the adjustment terminal ADJ and a ground electrode outside the directional coupler 10 (for example, on a substrate on which the mount component forming the directional coupler 10 is mounted). As exemplified in FIG. 1, when the termination circuit 13 is formed of a circuit in which a capacitance element and a resistance element are connected in parallel with each other, the capacitance value of the termination circuit 13 is adjusted to become larger with the connection of a capacitance element and the resistance value of the termination circuit 13 is adjusted to become smaller with the connection of a resistance element.

Accordingly, the capacitance value of the capacitance element of the termination circuit 13 is made smaller than the desired capacitance value, and the resistance value of the resistance element of the termination circuit 13 is made larger than the desired resistance value. Here, as an example, the desired capacitance value and resistance value are the capacitance value and the resistance value of the termination circuit 13 that allow the optimum directivity to be obtained in the directional coupler 10. The capacitance value and the resistance value of the termination circuit 13 that allow the optimum directivity to be obtained in the directional coupler 10 are the capacitance value and the resistance value that allow the termination circuit 13 to absorb the greatest number of signals propagating in the opposite direction from the signal that is to be extracted from the main line to the sub-line.

This makes it easy to optimize the directivity of the directional coupler 10 by adjusting the capacitance value and the resistance value of the termination circuit 13 by connecting circuit elements.

According to the thus-configured directional coupler 10, the adjustment terminal ADJ is provided as a lead-out terminal, and therefore the impedance of the termination circuit 13 can be measured via the adjustment terminal ADJ. Furthermore, circuit elements for reducing the deviation of the measured impedance from the desired impedance can be connected to the termination circuit 13 via the adjustment terminal ADJ. This enables the impedance of the termination circuit 13 to be corrected and the directivity of the directional coupler 10 to be brought closer to the optimum value.

Thus, since the directional coupler 10 is provided with the adjustment terminal ADJ, the impedance of the termination circuit 13 can be measured and corrected from outside the directional coupler 10 via the adjustment terminal ADJ. As a result, the directional coupler 10 can be obtained in which the directivity can be easily adjusted with high precision.

Embodiment 2

A radio-frequency module according to Embodiment 2 will be described using an example of a radio-frequency module formed by mounting a mount component, in which a directional coupler is formed, on a module substrate.

Figure 2:
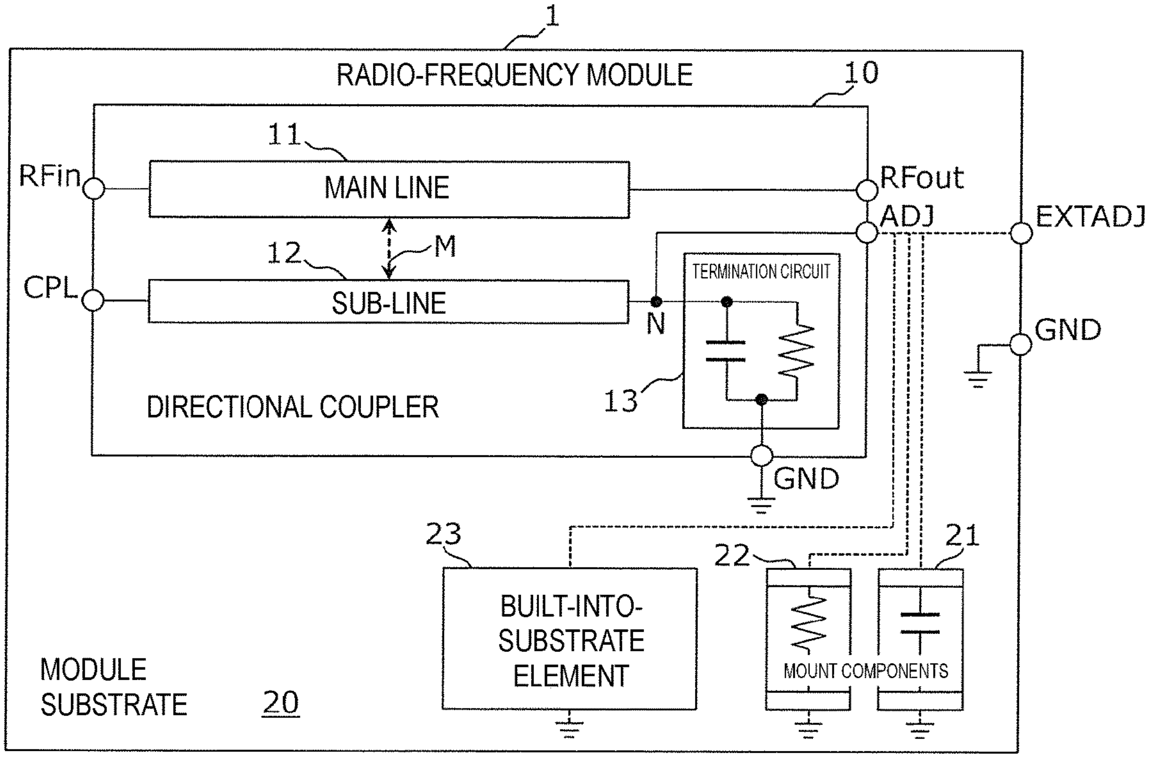
FIG. 2 is a circuit diagram illustrating an example of the functional configuration of a radio-frequency module according to Embodiment 2.

FIG. 2 is a circuit diagram illustrating an example of the functional configuration of a radio-frequency module 1 according to Embodiment 2. As illustrated in FIG. 2, the radio-frequency module 1 is formed by mounting the directional coupler 10 in FIG. 1 on a module substrate 20. In FIG. 2, the symbols of some of the constituent elements of the directional coupler 10 are omitted.

As an example, the module substrate 20 is a multilayer wiring substrate in which wiring conductors are disposed in a multilayer body consisting of a plurality of substrate layers composed of a resin material or a ceramic material.

The directional coupler 10 is mounted on the module substrate 20, and the module substrate 20 is also provided with at least one constituent element from among mount components 21 and 22, a built-into-substrate element 23, and an external adjustment terminal EXTADJ.

The mount components 21 and 22 are surface mount components in which a capacitance element and a resistance element are respectively formed and that are mounted on the module substrate 20.

The built-into-substrate element 23 is a circuit element that is formed inside the module substrate 20, and as an example, is a capacitance element that is formed of substrate layers composed of a ceramic material and a plurality of pattern conductors disposed with the substrate layers interposed therebetween.

The external adjustment terminal EXTADJ is a connection terminal for connecting a circuit element (not illustrated) provided outside the radio-frequency module 1 in parallel with the termination circuit 13 of the directional coupler 10.

One ends of each of the mount components (surface mount components) 21 and 22 and the built-into-substrate element 23, and the external adjustment terminal EXTADJ are connected to the adjustment terminal ADJ of the directional coupler 10. The other ends of the mount components 21 and 22 and the built-into-substrate element 23, and the ground terminal GND are connected to a ground electrode of the module substrate 20.

According to the thus-configured radio-frequency module 1, the impedance of the termination circuit 13 can be measured via the adjustment terminal ADJ after mounting the directional coupler 10 on the module substrate 20 and prior to connecting a circuit element to the adjustment terminal ADJ. Furthermore, a circuit element for reducing the deviation of the measured impedance from the desired impedance can be connected to the termination circuit 13 via the adjustment terminal ADJ. Here, the desired impedance is, for example, an impedance of the termination circuit 13 that allows the optimum directivity to be obtained in the directional coupler 10 when the directional coupler 10 is mounted on the module substrate 20. The mount components 21 and 22, the built-into-substrate element 23, and a circuit element (not illustrated) connected to the external adjustment terminal EXTADJ can be used as circuit elements connected to the termination circuit 13.

Thus, a shift in the impedance of the termination circuit 13 generated due to the directional coupler 10 being mounted on the module substrate 20 can be corrected, and the directivity of the directional coupler 10 when the directional coupler 10 is mounted on the module substrate 20 can be brought closer to the optimum value.

Thus, in the radio-frequency module 1, the impedance of the termination circuit 13 of the directional coupler 10 when the directional coupler 10 is mounted on the module substrate 20 can be measured and corrected from outside the directional coupler 10 by using the adjustment terminal ADJ of the directional coupler 10. As a result, the radio-frequency module 1 can be obtained in which the directivity of the directional coupler 10 can be easily adjusted with high precision after the directional coupler 10 is mounted.

Embodiment 3

A directional coupler according to Embodiment 3 will be described using an example of a directional coupler in which a termination circuit having a variable impedance is connected to one end of a sub-line.

Figure 3:
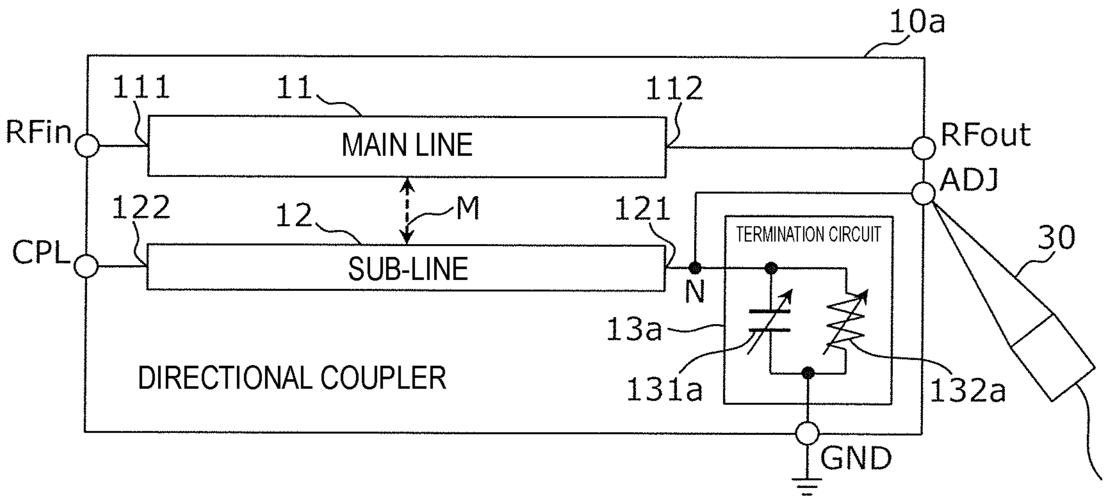
FIG. 3 is a circuit diagram illustrating an example of the functional configuration of a directional coupler according to Embodiment 3.

FIG. 3 is a circuit diagram illustrating an example of the functional configuration of a directional coupler 10*a* according to Embodiment 3. As illustrated in FIG. 3, the directional coupler 10*a* differs from the directional coupler 10 in FIG. 1 in that the impedance of a termination circuit 13*a* is variable.

As an example, the termination circuit 13*a* is formed of a circuit in which a variable capacitance element 131*a* and a variable resistance element 132*a* are connected in parallel with each other.

Although not illustrated, the variable capacitance element 131*a* may be formed of a plurality of capacitance elements and a switch element that switches the connections of the plurality of capacitance elements, and the variable resistance element 132*a* may be formed of a plurality of resistance elements and a switch element that switches connections of the plurality of resistance elements. The switch elements may switch the connection states in accordance with a control signal supplied to the directional coupler 10*a* from the outside and may include a memory element for storing the connection states.

When the directional coupler 10*a* is formed of an integrated circuit chip as a mount component, the termination circuit 13*a*, which includes switch elements and a memory element, can be easily formed so as to be integrated with the mount component together with the main line 11 and the sub-line 12.

According to the thus-configured directional coupler 10*a*, the impedance of the termination circuit 13*a* can be measured by applying a probe 30 of a measurement instrument to the adjustment terminal ADJ in the unadjusted state after manufacture of the directional coupler 10*a*. Furthermore, the impedance of the termination circuit 13*a* can be changed by supplying a control signal for reducing a deviation of the measured impedance from the desired impedance. Here, for example, the desired impedance is the designed impedance of the termination circuit 13*a* that allows the optimal directivity to be obtained in the directional coupler 10*a*. Thus, manufacturing errors in the impedance of the termination circuit 13*a* can be corrected and the directivity of the directional coupler 10*a* can be brought closer to the optimal value.

Figure 4:
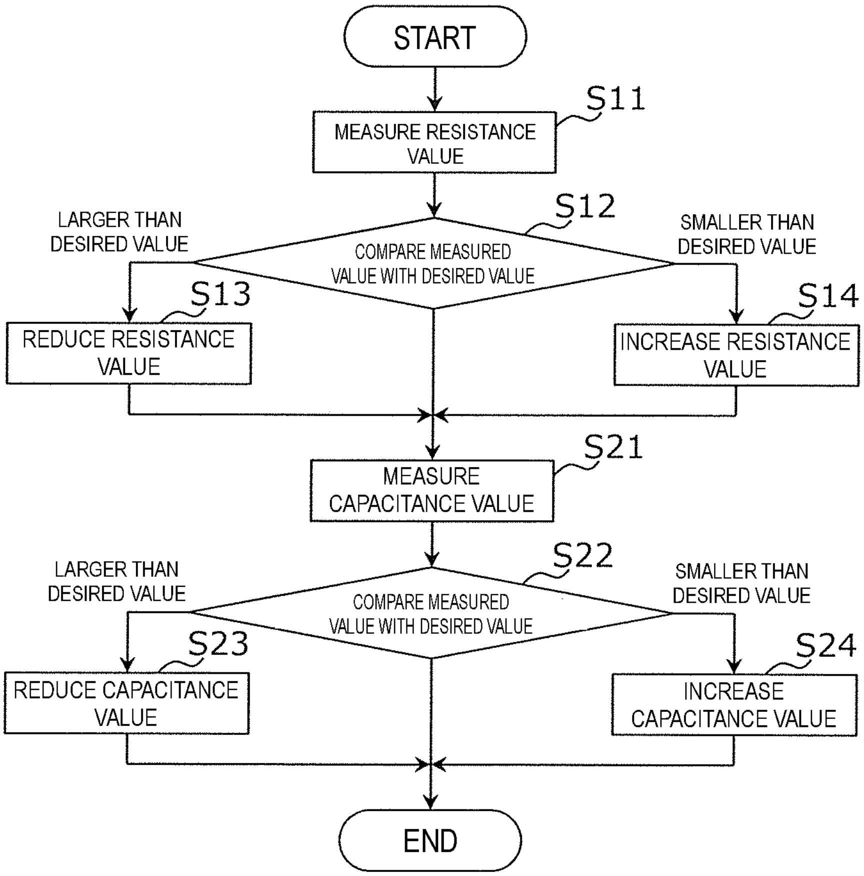
FIG. 4 is a flowchart illustrating an example of a method of adjusting the directional coupler according to Embodiment 3.

FIG. 4 is a flowchart illustrating an example of a method of adjusting the directional coupler 10*a*. In the example in FIG. 4, first, the resistance value is measured (S11) and then the measured value is compared with a desired value (S12). If the measured value is larger than the desired value, the resistance value of the termination circuit 13*a* is reduced (S13) using a control signal that instructs a smaller resistance value, and if the measured value is smaller than the desired value, the resistance value of the termination circuit 13*a* is increased (S14) using a control signal that instructs a larger resistance value.

Next, the capacitance value is measured (S21) and the measured value is compared with the desired value (S22). If the measured value is larger than the desired value, the capacitance value of the termination circuit 13*a* is reduced (S23) using a control signal that instructs a smaller capacitance value and if the measured value is smaller than the desired value, the capacitance value of the termination circuit 13*a* is increased (S24) using a control signal that instructs a larger capacitance value.

Thus, in the directional coupler 10*a*, the adjustment terminal ADJ is used to measure the impedance of the termination circuit 13*a*, and the impedance of the termination circuit 13*a* can be corrected using the variable function of the termination circuit 13*a* itself. Thus, manufacturing errors in the impedance of the termination circuit 13*a* (individual variations) can be canceled in the directional coupler 10*a* as a standalone unit before mounting the directional coupler 10*a* on the module substrate.

Embodiment 4

A directional coupler according to Embodiment 4 will be described using an example of a connection structure between the sub-line and the adjustment terminal ADJ.

Figure 5:
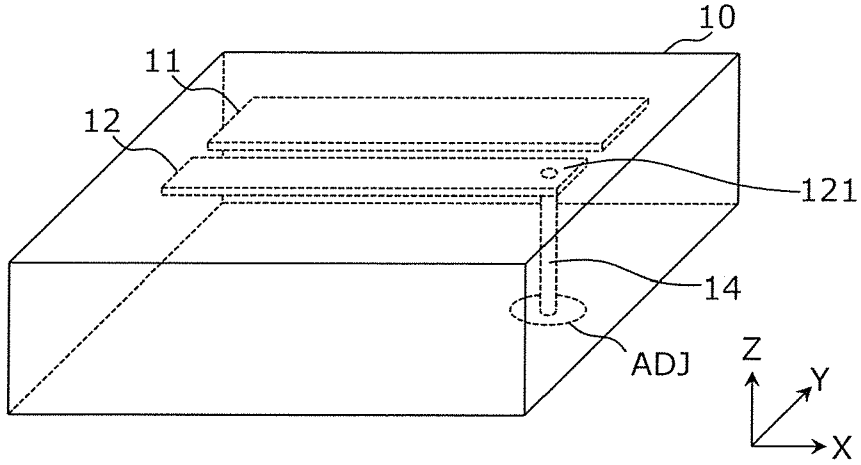
FIG. 5 is a perspective view schematically illustrating an example of the structure of a directional coupler according to Embodiment 4.

FIG. 5 is a perspective view schematically illustrating an example of the structure of the directional coupler according to Embodiment 4. FIG. 5 schematically illustrates arrangements of the main line 11, the sub-line 12, a via conductor 14, and the adjustment terminal ADJ of the directional coupler 10 with directions along a mounting surface of the directional coupler 10 (the surface on which mounting terminals are formed for mounting the directional coupler 10 on the module substrate) and a thickness direction of the directional coupler 10 being respectively taken to be XY directions and a Z direction.

The via conductor 14 is an example of a wiring line connected between the one end 121 of the sub-line 12, which is connected to the termination circuit (not illustrated), and the adjustment terminal ADJ.

The adjustment terminal ADJ is disposed at a position that overlaps the one end 121 of the sub-line 12 in a plan view of the directional coupler 10, i.e., when looking in the Z direction.

Therefore, the length of the wiring line from the one end 121 of the sub-line 12 to the adjustment terminal ADJ is easily reduced and parasitic components generated by the wiring line are easily suppressed. As a result, variations in the impedance of the termination circuit due to the effect of parasitic components of the wiring line are suppressed and therefore the directional coupler 10 in which the directivity is more easily adjusted can be obtained.

Figure 6:
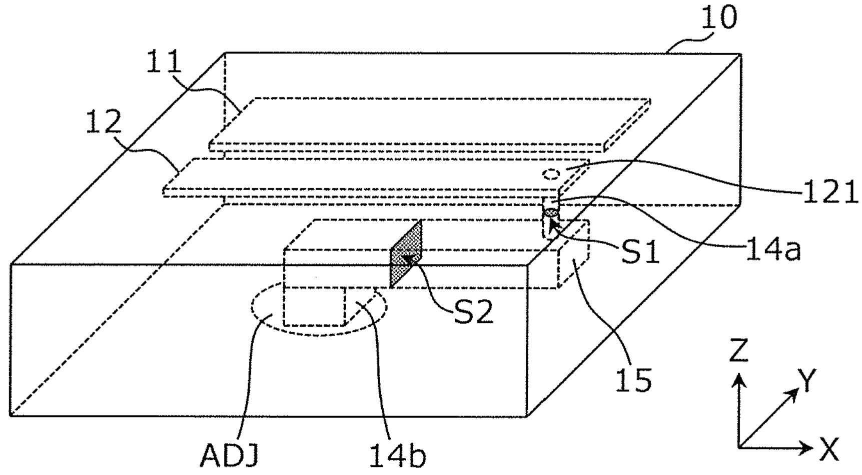
FIG. 6 is a perspective view schematically illustrating another example of the structure of a directional coupler according to Embodiment 4.

FIG. 6 is a perspective view schematically illustrating another example of the structure of a directional coupler according to Embodiment 4. FIG. 6 schematically illustrates the main line 11, the sub-line 12, via conductors 14*a* and 14*b*, a pattern conductor 15, and the adjustment terminal ADJ of the directional coupler 10 with directions along the mounting surface of the directional coupler 10 and a thickness direction of the directional coupler 10 being respectively taken to be XY directions and a Z direction.

The via conductors 14*a* and 14*b* and the pattern conductor 15 are an example of a wiring line connected between the one end 121 of the sub-line 12, which is connected to the termination circuit (not illustrated), and the adjustment terminal ADJ. The via conductor 14*a* corresponds to a first section of the wiring line, and the via conductor 14*b* and the pattern conductor 15 correspond to a second section of the wiring line.

The adjustment terminal ADJ is disposed at a position that does not overlap the one end 121 of the sub-line 12 in a plan view of the directional coupler 10, i.e., when looking in the Z direction. In addition, the cross-sectional area of via conductor 14*a* is S1, the cross-sectional area of pattern conductor 15 is S2, which is larger than S1, and the combined length of the via conductor 14*b* and pattern conductor 15 is longer than the length of the via conductor 14*a*.

The term "cross-sectional area" used here does not refer to a cross-sectional area obtained when a via conductor or pattern conductor is cut in the direction in which the via conductor or pattern conductor extends, but rather refers to a cross-sectional area obtained when the via conductor or pattern conductor is cut in a direction substantially perpendicular to the direction in which the via conductor or pattern conductor extends. In other words, the cross-sectional areas of the via conductors 14*a* and 14*b* are the cross-sectional areas obtained by cutting along the XY plane in FIG. 6, and the cross-sectional area of the pattern conductor 15 is the cross-sectional area obtained by cutting along the YZ plane in FIG. 6.

Therefore, even if the length of the wiring line from the one end 121 of the sub-line 12 to the adjustment terminal ADJ is somewhat long, parasitic components generated by the wiring line are easily suppressed by providing the via conductor 14*b* and the pattern conductor 15 having the large cross-sectional area S2 so as to be longer than the via conductor 14*a* having the small cross-sectional area S1. As a result, variations in the impedance of the termination circuit due to the effect of parasitic components of the wiring line are suppressed and therefore the directional coupler 10 in which the directivity is more easily adjusted can be obtained.

In this specification, "an end portion of the sub-line 12" refers to an end portion of a section of the pattern conductor constituting the sub-line 12 that is disposed so as to intentionally couple with the main line 11 in order to obtain a desired degree of coupling in the directional coupler 10. The end portion of the sub-line 12 is, for example, defined as the end portion of a section of the pattern conductor forming the sub-line 12 that has a fixed distance from the main line 11, i.e., the end portion of the section that has the shortest distance from an arbitrary point included in the section to the main line 11. In addition, as another example, the end portion is defined as the end portion of a section of the pattern conductor forming the sub-line 12 in which at least one out of the line width and the thickness is constant.

A directional coupler of the present disclosure has been described above on the basis of embodiments, but the present disclosure is not limited to individual embodiments. Various modifications, as thought of by those skilled in the art, made to the embodiments and other embodiments formed by combining constituent elements of different embodiments may also be included in the scope of one or a plurality of modes of the present disclosure so long as the modifications and embodiments do not depart from the spirit of the present disclosure.

SUMMARY

As described above, a directional coupler according to an aspect of the present disclosure includes a main line, a sub-line, and a termination circuit that is connected to one end of the sub-line, and further includes a lead-out terminal that is led out from a node between the one end of the sub-line and the termination circuit.

With this configuration, since the lead-out terminal is provided, the impedance of the termination circuit can be measured via the lead-out terminal. Furthermore, a circuit element for reducing the deviation of the measured impedance from the desired impedance can be connected to the termination circuit via the lead-out terminal. As a result, a directional coupler can be obtained in which the directivity can be easily adjusted with high precision.

In addition, the lead-out terminal may be connected in parallel with the termination circuit.

Furthermore, an impedance of the termination circuit may be fixed.

With this configuration, since a termination circuit having a fixed impedance is used, a directional coupler having a simple configuration and in which the directivity can be easily adjusted with high precision can be obtained.

Furthermore, an impedance of the termination circuit may be variable.

With this configuration, the impedance of the termination circuit can be variably controlled on the basis of the impedance of the termination circuit measured via the lead-out terminal, and therefore a directional coupler can be obtained in which the directivity can be easily adjusted with high precision. Since a termination circuit having a variable impedance is used, it is possible to cancel manufacturing errors in the impedance of the termination circuit with the directional coupler as a standalone unit prior to mounting the directional coupler on a substrate, for example.

Furthermore, the directional coupler according to the aspect of the present disclosure may be formed of a mount component.

In addition, in a plan view of the mount component, the lead-out terminal may be disposed at a position that overlaps the one end of the sub-line connected to the termination circuit.

With this configuration, the length of a wiring line from the one end of the sub-line to the lead-out terminal is easily shortened, and therefore parasitic components generated by the wiring line are easily suppressed. As a result, variations in the impedance of the termination circuit due to the effect of parasitic components of the wiring line are suppressed and therefore a directional coupler in which the directivity is more easily adjusted can be obtained.

Furthermore, in a plan view of the mount component, the lead-out terminal may be disposed at a position that does not overlap the one end of the sub-line connected to the termination circuit, the one end of the sub-line and the lead-out terminal may be connected to each other inside the mount component by a wiring line including a first section having a first cross-sectional area and a second section having a second cross-sectional area that is larger than the first cross-sectional area, and a length of the second section may be longer than a length of the first section.

With this configuration, even if the length of the wiring line from the one end of the sub-line to the lead-out terminal is somewhat long, parasitic components generated by the wiring line are easily suppressed by providing a section of the wiring line having a larger cross-sectional area so as to be longer than a section of the wiring line having a smaller cross-sectional area. As a result, variations in the impedance of the termination circuit due to the effect of parasitic components of the wiring line are suppressed and therefore a directional coupler in which the directivity is more easily adjusted can be obtained.

Furthermore, the termination circuit may be formed of a circuit in which a capacitance element and a resistance element are connected in parallel with each other, a capacitance value of the capacitance element may be smaller than a capacitance value with which the directivity of the directional coupler is optimized, and a resistance value of the resistance element may be larger than a resistance value with which the directivity of the directional coupler is optimized.

With this configuration, circuit elements are connected in parallel with the termination circuit via the lead-out terminal, and as a result, the capacitance value of the termination circuit is adjusted so as to become larger and the resistance value of the termination circuit is adjusted so as to become smaller by connecting the circuit elements. Consequently, the capacitance value and the resistance value of the termination circuit can be easily adjusted by connecting circuit elements as a result of the capacitance value of the capacitance element of the termination circuit having been made smaller than the optimum capacitance value of the termination circuit and the resistance value of the resistance element of the termination circuit having been made larger than the optimum resistance value of the termination circuit.

Furthermore, a radio-frequency module according to an aspect of the present disclosure includes the directional coupler and a circuit element that is connected to the lead-out terminal of the directional coupler.

With this configuration, a radio-frequency module can be obtained in which the directivity of a directional coupler mounted in the radio-frequency module can be easily adjusted with high precision from outside the directional coupler by using a circuit element.

The present disclosure can be widely used as a directional coupler and a radio-frequency module.

1 radio-frequency module
10, 10*a* directional coupler
11 main line
111 one end of main line
112 other end of main line
12 sub-line
121 one end of sub-line
122 other end of sub-line
13, 13*a* termination circuit
131 capacitance element
131*a* variable capacitance element
132 resistance element
132*a* variable resistance element
14, 14*a*, 14*b* via conductor
15 pattern conductor
20 module substrate
21, 22 mount component
23 built-into-substrate element
30 probe
N node
RFin input terminal
RFout output terminal
CPL coupling terminal
ADJ adjustment terminal (lead-out terminal)
GND ground terminal

The invention claimed is:

1. A directional coupler comprising:
a main line;
a sub-line;
a termination circuit connected to one end of the sub-line; and
a lead-out terminal led out from a node between the one end of the sub-line and the termination circuit,
wherein the termination circuit is comprised of a circuit having a capacitance element and a resistance element connected in parallel with each other,
wherein the directional coupler is comprised of a mount component,
wherein, in a plan view of the mount component, the lead-out terminal is disposed at a position not overlapping the one end of the sub-line connected to the termination circuit, and
wherein the one end of the sub-line and the lead-out terminal are connected to each other inside the mount component by a wiring line including a first section having a first cross-sectional area and a second section having a second cross-sectional area larger than the first cross-sectional area, and a length of the second section is longer than a length of the first section.

2. The directional coupler according to claim 1, wherein the lead-out terminal is connected in parallel with the termination circuit.

3. The directional coupler according to claim 2, wherein an impedance of the termination circuit is fixed.

4. The directional coupler according to claim 2, wherein an impedance of the termination circuit is variable.

5. The directional coupler according to claim 2, wherein
a capacitance value of the capacitance element is smaller than a capacitance value with which the directivity of the directional coupler is optimized, and a resistance value of the resistance element is larger than a resistance value with which the directivity of the directional coupler is optimized.

6. The directional coupler according to claim 1, wherein an impedance of the termination circuit is variable.

7. The directional coupler according to claim 6, wherein a capacitance value of the capacitance element is smaller than a capacitance value with which the directivity of the directional coupler is optimized, and a resistance value of the resistance element is larger than a resistance value with which the directivity of the directional coupler is optimized.

8. The directional coupler according to claim 1, wherein a capacitance value of the capacitance element is smaller than a capacitance value with which the directivity of the directional coupler is optimized, and a resistance value of the resistance element is larger than a resistance value with which the directivity of the directional coupler is optimized.

9. The directional coupler according to claim 1, wherein an impedance of the termination circuit is fixed.

10. The directional coupler according to claim 9, wherein a capacitance value of the capacitance element is smaller than a capacitance value with which the directivity of the directional coupler is optimized, and a resistance value of the resistance element is larger than a resistance value with which the directivity of the directional coupler is optimized.

11. A directional coupler comprising:

a main line;

a sub-line;

a termination circuit connected to one end of the sub-line; and a lead-out terminal led out from a node between the one end of the sub-line and the termination circuit, wherein the termination circuit is comprised of a circuit having a capacitance element and a resistance element connected in parallel with each other, wherein the directional coupler is comprised of a mount component, and wherein, in a plan view of the mount component, the lead-out terminal is disposed at a position overlapping the one end of the sub-line connected to the termination circuit.

12. The directional coupler according to claim 11, wherein a capacitance value of the capacitance element is smaller than a capacitance value with which the directivity of the directional coupler is optimized, and a resistance value of the resistance element is larger than a resistance value with which the directivity of the directional coupler is optimized.

13. A directional coupler comprising:

a main line;

a sub-line;

a termination circuit connected to one end of the sub-line; and a lead-out terminal led out from a node between the one end of the sub-line and the termination circuit, wherein the termination circuit is comprised of a circuit having a capacitance element and a resistance element connected in parallel with each other, and wherein a capacitance value of the capacitance element is smaller than a capacitance value with which the directivity of the directional coupler is optimized, and a resistance value of the resistance element is larger than a resistance value with which the directivity of the directional coupler is optimized.

14. A radio-frequency module comprising:

the directional coupler according to claim 1; and a circuit element connected to the lead-out terminal of the directional coupler.

* * * * *